3,119,839
PREPARATION OF TETRAHYDROPYRANES AND TETRAHYDROTHIAPYRANES
Johann Gustav David Schulz, Pittsburgh, Pa., assignor to Gulf Research & Development Company, Pittsburgh, Pa., a corporation of Delaware
No Drawing. Filed Mar. 9, 1961, Ser. No. 94,439
12 Claims. (Cl. 260—327)

This invention relates to the preparation of heterocyclic compounds of sulfur or oxygen by the intramolecular rearrangement of selected aldehydes, ketones or their thio analogues.

It has been discovered that the heterocyclic compounds, cyclic ethers and their corresponding sulfur analogues, can readily be prepared by adding an aldehyde, ketone, thio-aldehyde or thio-ketone having an aliphatic chain of at least six carbon atoms and containing a tertiary hydrogen atom attached to a carbon atom in the delta position with respect to the carbonyl group in said aldehydes or ketones to an acidic condensation catalyst miscible therewith to form a homogeneous single phase mixture, and then recovering from the mixture the heterocyclic compound so produced. The cyclic ethers obtained in the reaction are substituted tetrahydropyranes or the corresponding thiapyranes.

The formation of heterocyclic compounds in accordance with the invention is unexpected and surprising. Normally, aldolization is the expected reaction when an aldehyde or ketone having an alpha hydrogen atom undergoes self-condensation in the presence of an acidic condensation catalyst. However, although aldolization occurs to some extent in the process of the present invention when the aldehyde or ketone contains an alpha hydrogen atom, the predominant reaction is cyclization which appears to be due to the presence of an active hydrogen atom (the tertiary hydrogen atom) attached to the tertiary carbon atom in the delta position.

It has been found that only selected aldehydes or ketones or thio analogues thereof will undergo intramolecular rearrangement to produce cyclic ethers or thio ethers. In the discussion which follows, the terms "aldehyde," "ketone" and "ether" will be taken to include the thio analogues thereof. In order to be amenable to the rearrangement process of this invention, the charge stock must be an aldehyde or ketone having an aliphatic chain of at least six carbon atoms and containing a tertiary hydrogen atom attached to a carbon atom in the delta position with respect to the carbonyl group in said aldehyde or ketone. By a tertiary hydrogen is meant one which, if replaced by a hydroxyl group in the molecule, would result in the formation of a tertiary alcohol. Otherwise stated, a tertiary hydrogen atom is a hydrogen atom attached to a tertiary carbon atom. The tertiary hydrogen atom must be present in the delta position with respect to the aldehyde or ketone group. In accordance with the invention, 3,5-dimethylhexanal undergoes intramolecular rearrangement to form the cyclic ether 2,2,4-trimethyltetrahydropyran. Other representative aldehydes or ketones which undergo the intramolecular rearrangement reaction of this invention include: 4,5-dimethylhexanal; 3 - ethyl - 5 - methylhexanal; 4-methyl-5-phenylthiohexanal; 10-methyl-6-hexadecanone; 5-propyloctanal; 1,3,5-trimethyldodecanal; and 9-methyl-5-undecathione.

The aldehydes and ketones, as defined above, need not be in pure form, but can be employed as mixtures. For example, suitable mixtures of aldehydes are produced in the hydroformylation of branched chain higher olefins. One preferred aldehyde charge stock is the product from the hydroformylation of mixed branched chain heptenes and in particular the top fraction thereof boiling up to 150° C.

The rearrangement reaction of this invention is promoted by an acidic type catalyst which is miscible with the charge stock and forms a homogeneous mixture therewith. These catalysts, however, also promote the aldol condensation reaction, if the aldehyde or ketone charge stock has at least one hydrogen on the carbon atom which is alpha to the carbonyl group. Some of the aldehydes and ketones which satisfy the requirements for the charge stock of the process of this invention will, therefore, also undergo aldol condensation. It is, therefore, a feature of this invention that the competing aldol condensation reaction is avoided in large part by the addition of the charge stock to the acid condensation catalyst. If, however, mixtures of aldehydes are employed, such as the products from the hydroformylation of suitable olefins, there may be present diluent aldehydes which cannot, because of the absence in their structure of a tertiary hydrogen in the delta position, undergo the rearrangement reaction, but which can undergo the aldol condensation reaction even under the reaction conditions of this invention. It may be desirable, therefore, to separate any such diluent aldehydes. If desired, inert diluents can be employed for the purpose of aiding the removal of the exothermic heat of reaction. Such diluents include liquid saturated aliphatic or cycloaliphatic hydrocarbons, such as hexanes, decanes, heptanes, octanes, undecanes, cyclohexane, decalin, and the like.

In a preferred aspect of the invention when using an aldehyde, the aldehyde is employed in the form of a polymer obtained in known manner, as in the case of paraldehyde, by the addition of a small amount of sulfuric acid. The use of the polymer, hereinafter referred to as the "para" form of the charge aldehyde, results in higher yields of the desired cyclization product.

The acidic condensation catalysts employed in the process of the invention are themselves known in the art. They are strong acids or acid-acting substances heretofore known to be useful, among other applications, as catalysts in the alkylation of aromatic hydrocarbons and in the polymerization and isomerization of olefins. For example, sulfuric acid, anhydrous hydrogen fluoride, phosphoric acid, boron fluoride and its water and ether complexes, and mixtures thereof, represent suitable acidic condensation catalysts.

In the practice of the invention with the acidic condensation catalysts, it is necessary that the acidic condensation catalyst and the aldehyde or ketone charge stock be mutually miscible so that upon addition of the charge stock to the catalyst a homogenous single phase mixture is obtained. If the charge stock and catalyst are not mutually miscible and more than one phase exists in the reaction mass, cyclization is not obtained, but instead, there is a tendency for aldolization to occur. The above requirement for the formation of a homogenous single phase between the charge stock and catalyst seems to limit the amount of water which can be present in the catalysts. Thus, it has been found that, with sulfuric acid as the catalyst, the $H_2SO_4$ content should be at least 80 percent. With the phosphoric acid, the $H_3PO_4$ content should be at least 90 percent. Boron trifluoride can be employed in the form of its complexes with water, molar ratios of boron trifluoride to water of 1:1 and 1:1.5 being used successfully. Other ratios of about 10:1 to 1:2 can also be employed. Pressures above atmospheric are required to prepare and maintain the $BF_3$:water catalyst at ratios of $BF_3$ to water above about 1 to 1. A mixture of boron trifluoride, water and phosphoric acid (100 percent $H_3PO_4$) in the mol ratios, 1:0.23:1.27 is also satisfactory. From the standpoint of obtaining excellent yields of the desired product, the $BF_3 \cdot H_2O$ complex, i.e., equimolar amounts of boron trifluoride and water, is the most preferred catalyst.

For the foregoing, it will be apparent to one skilled in the art that the suitability of various acid catalysts or catalyst combinations can be readily and simply ascertained by observing whether the charge stock and the catalyst form a homogeneous single phase solution or an inhomogeneous multiple phase mixture. Catalysts which form the latter are not suitable.

The catalysts are preferably employed in molar excess with respect to the charge stock. The reason for this is that with smaller amounts of catalyst there is a tendency to reduce the yields of desired product. Accordingly, large excesses of catalyst, as high as 20 mols of catalyst to one mol of charge stock, can be employed. Preferred molar ratios of acidic condensation catalysts to charge stock range from about 3:1 to about 12:1, the higher ratios within this range giving the higher yields.

The intramolecular rearrangement reaction of the invention occurs at low temperatures of 0° C. or less. The minimum reaction temperature is limited only by the formation of a solid phase caused by freezing of the catalyst or charge stock, thereby withdrawing needed catalyst or charge stock from the reaction.

Since the reaction already proceeds at a satisfactory rate at relatively low temperatures of from 0° to 25° C., it is ordinarily unnecessary to employ higher temperatures. However, higher temperatures, up to 150° C. can be employed, if desired. Since in most instances the charge stock will contain structure permitting aldolization as well as the cyclization of the invention, it is preferable to operate at a lower temperature in the range from about 0° to 100° C.

Pressures above and below atmospheric can be employed, but have no particular advantage unless, as noted above, increased pressures are required to enable the use of $BF_3$-water catalysts, where the $BF_3$ to water ratio is above about 1 to 1. Atmospheric pressure is, therefore, preferred.

The reaction mass after reaction comprises the acidic catalyst, some unreacted charge and the desired cyclic ethers. In order to prevent the degradation of the desired cyclization product and/or the continuation of undesired side reactions, such as aldolization, it is desirable to separate or kill the acidic condensation catalyst upon completion of the reaction. This can be accomplished by any suitable means and preferably by the addition of an amount of water at least sufficient to result in the formation of an aqueous phase and an organic phase or layer containing the desired product. The two phases are then separated by any conventional means, such as by decantation, or the like. After the separation, any residual acid can be removed from the organic phase in any suitable manner, such as by washing with a basic solution, for example, a 10 percent aqueous sodium hydroxide or sodium carbonate solution followed again by separation and washing of the organic layer with water and finally by fractionation of the organic layer to separate the desired cyclic ethers therefrom.

The process of this invention will be further described with reference to the following specific examples.

In the first eleven examples the charge stock consisted of a front end distillate fraction of a mixture of Oxo octylaldehydes obtained as a product from the hydroformylation in known manner of branched chain heptenes. The heptenes, in turn, are obtained as a copolymer of propylene and butylenes in the presence of a phosphoric acid catalyst with the fraction of the copolymer boiling between 170° to 210° F. and having a heptene content of about 90 to 100 percent being used as the charge stock. The Oxo octylaldehydes were distilled to yield a front end fraction boiling up to 150° C. at atmospheric pressure. Analysis showed that this front end distillate was composed of 90 percent 3,5-dimethylhexanal.

Six mols of sulfuric acid having an $H_2SO_4$ content of 96 percent were added to a reaction vessel provided with means for cooling and agitation and were cooled to 0° C. One mol of the charge aldehyde was added to the acid over a period of 60 minutes with vigorous stirring while the reaction mixture was maintained at about 0° C. The charge stock had an average molecular weight of 128. Thereafter, the reaction mixture was stirred for an additional 10 minutes while being maintained at about 0° C. by cooling. The reaction mixture was then poured into 2,000 ml. of ice water in a separatory funnel, shaken and allowed to settle. The lower layer containing the water and sulfuric acid was removed. The remaining upper layer was treated with 100 ml. of 5 percent aqueous sodium hydroxide, separated from the base, washed with water, separated therefrom, distilled to recover the fraction coming out at a constant temperature of 136.4° C. at 746.8 mm. of mercury, and sent for analysis. The physical properties of the product are given in Table I below. The properties of a known cyclic ether, 2,2,6-trimethyltetrahydropyran are also given on Table I for comparison purposes. The yield of cyclic ether by distillation based on the charge was found to be 60 mol percent.

*Table I*

| Property | Product Example 1—2,2,4-trimethyl tetrahydropyran | 2,2,6-trimethyl tetrahydropyran [1] |
|---|---|---|
| Specific Gravity; ASTM D287: 60°/60° F. | 0.8493 | 0.853. |
| Molecular Weight: | | |
| Mass Spec. | 128 | |
| Theoretical | 128.2 | |
| Color | Water White | |
| Refractive Index | 1.4250 | 1.4285. |
| Odor | Sweet, Mint-like | Peppermint. |
| Boiling Point, ° C., at 746.8 mm. Hg. | 136.4 | 127–128. |
| Solubility | Miscible with most organic solvents. | |
| Analysis, Percent by Weight: | | Calculated |
| Carbon | 74.5 | 75.0 |
| Hydrogen | 12.4 | 12.5 |
| Oxygen (by difference) | 13.1 | 12.5 |

[1] This information from Bulletin de la Societee de Chimie de France (4) 45, 356.

EXAMPLE 2

Example 1 was repeated except the para form of the charge aldehyde was employed and the total reaction time including the addition of the aldehyde was reduced to 32 minutes. The para form of the aldehyde was prepared by the addition of one ml. of 96 percent sulfuric acid to one mol of the isooctylaldehyde in 400 ml. of hexane at a temperature between 0° and −30° C. with vigorous stirring for a time period of 30 minutes. The product work up was the same as in Example 1 above. The yield of cyclic ethers was 69.5 mol percent of the charge. A comparison of Example 1 with this example shows that the para form of the aldehyde charge results in a higher yield.

EXAMPLE 3

Example 2 was repeated except the mol ratio of acid to aldehyde was reduced to 3:1 and the reaction time after the aldehyde addition was increased to 90 minutes. Upon separation, neutralization and fractionation of the organic layer, a yield of 52 mol percent based on the charge was obtained.

EXAMPLE 4

Example 2 was repeated except that the acid to charge ratio was increased to 9:1. As a result of this increase in acid to charge ratio, the yield was increased to 74 mol percent based on the charge.

Comparing the yields of product obtained in Examples 2, 3 and 4 with the mol ratios of acid to aldehyde charge in each example, it is apparent that the larger amounts of acid catalyst result in higher yields of desired product.

EXAMPLE 5

Example 2 was repeated except that the sulfuric acid employed had an $H_2SO_4$ content of 80 percent and the reaction time after the aldehyde addition was increased to 180 minutes. A yield of only 3 mol percent based on the charge was obtained in the product.

EXAMPLE 6

Example 1 was repeated except the sulfuric acid had an $H_2SO_4$ content of 100 percent. The yield was found to be about 65 mol percent based on the charge.

EXAMPLE 7

In this example a complex of $BF_3$ and water was employed as the catalyst wherein the molar ratio of $BF_3$ to water was 1:1. Three mols of the catalyst were added to a reaction vessel equipped with means for cooling and agitation and were cooled to 0° C. One mole of the charge aldehyde was added to the catalyst complex over a period of one minute with vigorous stirring while the temperature was maintained at about 0° C. It was noted that the reaction mixture was a homogeneous single phase solution. Thereafter, the reaction mixture was stirred for an additional 4 minutes while being maintained at about 0° C. by cooling. The reaction mixture was then poured into 500 ml. of ice water in a separatory funnel, shaken and allowed to settle. The lower layer containing the water and most of the catalyst was removed. The remaining upper layer was treated with 100 ml. of 5 percent aqueous sodium hydroxide, separated from the base, washed with water, separated therefrom, fractionated, and a portion of the constant boiling fraction analyzed by gas-liquid chromatography which indicated that about 90 mol percent of the charge had been converted to the cyclic ether.

EXAMPLE 8

Example 7 was repeated except the catalyst employed was a complex of $BF_3$ and water wherein the molar ratio of $BF_3$ to water was 1:1.5. The yield as determined by gas-liquid chromatographic analysis was about 75 mol percent based on the charge.

EXAMPLE 9

Example 7 was again repeated except the catalyst employed was phosphoric acid having an $H_3PO_4$ content of 85 percent. No cyclic ether product was obtained. It was noted the phosphoric acid catalyst and the charge aldehyde were not miscible but formed two phases instead. This example further illustrates the importance of the requirement that the charge stock and catalyst be miscible to form a homogeneous solution if the desired product is to be obtained.

EXAMPLE 10

Example 7 was repeated except the catalyst employed was 100 percent phosphoric acid. The reaction time after the aldehyde addition was extended to five hours. Samples of the reaction mixture was taken from time to time throughout this five hour reaction period, worked up as previously described, and analyzed by gas-liquid chromatography to determine the cyclic ether product content. After five minutes the cyclic ether content of the product was four mol percent based on the charge. After ten minutes the cyclic ether content of the product was about 10 mol percent based on the charge. After 30 minutes the cyclic ether content of the product had increased to 20 mol percent based on the charge and at the end of five hours the cyclic ether content of the product had increased to 25 mol percent based on the charge.

EXAMPLE 11

Example 7 was repeated except the catalyst was a mixture of $BF_3$ and 85 percent phosphoric acid, wherein the molar ratio of $BF_3$ to water to 100 percent phosphoric acid was 1:0.23:1.27. The yield as determined by gas-liquid chromatographic analysis was about 80 mol percent based on the charge.

The charge stock for Examples 12 through 19 was a mixture of Oxo octylaldehydes having a typical analysis as shown in Table II below.

*Table II*

| Component: | Weight Percent |
|---|---|
| 3,4-dimethylhexanal | 20 |
| 3,5-dimethylhexanal | 30 |
| 4,5-dimethylhexanal | 25 |
| 3-methylheptanal | |
| 5-methylheptanal | |
| Unidentified aldehydes | { 15 <br> { 10 |

EXAMPLE 12

Twelve mols of sulfuric acid having an $H_2SO_4$ content of 96 percent were added to a reaction vessel provided with means for cooling and agitation and were cooled to 0° C. To this catalyst over a period of seven minutes was added a mol of the charge aldehyde. This charge stock had an average molecular weight of 128. Throughout the addition of the charge to the acid, the mixture was stirred vigorously while the temperature was maintained at about 0° C. Thereafter, the reaction mixture was stirred for an additional 10 minutes while being maintained at about 0° C. by cooling. The reaction mixture was then poured into 1,000 ml. of ice water in a separatory funnel, shaken and allowed to settle. The lower layer containing the water and sulfuric acid was removed. The remaining upper layer was then washed with 100 ml. of 5 percent aqueous sodium hydroxide, separated from the base, washed with water, separated therefrom, fractionated, and sent for analysis. Analysis by gas-liquid chromatography indicated that 70 mol percent of the charge material had been converted to cyclic ethers.

EXAMPLE 13

Example 12 was repeated with the exception that 100 ml. of hexane diluent were added with the charge and the reaction time after the addition of the charge aldehyde was 22 minutes. The separation procedure was the same as in Example 12. Analysis by gas-liquid chromatography indicated again that 70 mol percent of the charge material had been converted to cyclic ethers.

EXAMPLE 14

Example 13 was repeated except that six mols of the sulfuric acid catalyst were employed, the reaction temperature was slightly higher at +7° C., and the reaction time after the aldehyde addition was slightly longer at 30 minutes. The separation procedure was essentially the same as in Example 13. An analysis by gas-liquid chromatography indicated that the yield of cyclic ethers was about 60 mol percent based on the charge material.

EXAMPLE 15

Example 14 was repeated except the reaction temperature was reduced to −10° C. and the reaction time after the aldehyde addition was reduced to 10 minutes. The separation procedure was essentially the same as in Example 14. An analysis by gas-liquid chromatography indicated the yield of cyclic ethers was 30 mol percent based on the charge.

EXAMPLE 16

Example 15 was repeated except that the reaction time after the aldehyde addition was increased to 45 minutes. Analysis by gas-liquid chromatography indicated the yield of cyclic ethers to be about 35 mol percent based on the charge.

EXAMPLE 17

Example 14 was repeated except that the reaction temperature was reduced to −25° C. The yield of cyclic ethers was 30 mol percent based on the charge.

EXAMPLE 18

Example 14 was again repeated except that the reaction temperature was further reduced to −38° C. Due to this further reduction in reaction temperature, the acid catalyst was partly frozen. The result was that a portion of the acid was unavailable and the yield of cycle ethers was further reduced to 15 mol percent. Although the process of the invention was operable at the low temperature of −38° C., the low yields of product obtained show the desirability of operating at higher temperatures where no solidification occurs.

EXAMPLE 19

In this example, the quantities of material and the reaction conditions were essentially the same as those for Example 14 above, except that, instead of adding the charge to the acid, the charge material was initially added to the reaction vessel and the acid was subsequently added over a period of 25 minutes. This difference in the order of addition of the charge stock and catalyst resulted in no cyclic ethers being obtained at all. Instead, the entire product was found to be a resin obtained by aldolization. Therefore, it is an important feature of the invention that the charge stock be added to the acidic condensation catalyst rather than the reverse.

The cyclic ethers produced by the process of the present invention are of value as special solvents and as chemical intermediates in the preparation of glycols, seven-membered lactones or di-functional polymerizable materials, such as hydroxy acids. The pyrans will also undergo the same reactions as the five-membered cyclic furans. Substituted tetrahydrofurans can be cleaved to dichlorides by reaction with inorganic acid chlorides. This and other reactions are described in Justus Liebigs Annalen der Chemie, 596, 1–224 (1955).

Resort may be had to such variations and modifications as fall within the spirit of the invention and the scope of the appended claims.

I claim:

1. A process for the production of a heterocyclic compound selected from the class consisting of tetrahydropyranes and tetrahydrothiapyranes which comprises adding a carbonyl compound selected from the class consisting of aldehydes, ketones, and the sulfur analogues thereof to an acidic condensation catalyst miscible therewith to form a homogeneous mixture, said carbonyl compound having a saturated aliphatic chain of between 6 and 16 carbon atoms and having a tertiary hydrogen atom attached to a carbon atom in the delta position with respect to the carbonyl group in said carbonyl compound.

2. The process of claim 1 wherein the acidic condensation catalyst is sulfuric acid having an $H_2SO_4$ concentration of at least 80 percent.

3. The process of claim 1 wherein the acidic condensation catalyst is a complex of $BF_3$ and water.

4. A process for the production of a tetrahydropyranyl compound which comprises adding an aldehyde to an acidic condensation catalyst miscible therewith to form a homogeneous mixture, said aldehyde having a saturated aliphatic chain of between 6 and 16 carbon atoms and having a tertiary hydrogen atom attached to a carbon atom in the delta position with respect to the carbonyl group in said aldehyde.

5. A process for the production of a tetrahydrothiapyranyl compound which comprises adding a thio-aldehyde to an acidic condensation catalyst miscible therewith to form a homogeneous mixture, said thio-aldehyde having a saturated aliphatic chain of between 6 and 16 carbon atoms and having a tertiary hydrogen atom attached to a carbon atom in the delta position with respect to the thiocarbonyl group in said thio-aldehyde.

6. A process for the preparation of a tetrahydropyranyl compound which comprises adding an aldehyde to an acidic condensation catalyst miscible therewith to form a homogeneous mixture, wherein the molar ratio of said aldehyde to said acidic condensation catalyst is between 1:1 and 1:20 and wherein the temperature is maintained between −25° C. and 150° C., said aldehyde having a saturated aliphatic chain of between 6 and 16 carbon atoms and having a tertiary hydrogen atom attached to a carbon atom in the delta position with respect to the carbonyl group in said aldehyde.

7. A process for the preparation of a tetrahydropyranyl compound which comprises adding an aldehyde to an acidic condensation catalyst miscible therewith to form a homogeneous mixture, wherein the molar ratio of said aldehyde to said acidic condensation catalyst is between 1:3 and 1:15 and wherein the temperature is maintained between 0° C. and 100° C., said aldehyde having a saturated aliphatic chain of between 6 and 16 carbon atoms and having a tertiary hydrogen atom attached to a carbon atom in the delta position with respect to the carbonyl group in said aldehyde, adding the product mixture to a sufficient amount of water to cause a phase separation, separating the organic layer therefrom, and recovering the desired tetrahydropyranyl compound from said organic layer.

8. A process for the preparation of a tetrahydrothiapyranyl compound which comprises contacting a thio-aldehyde with an acidic condensation catalyst miscible therewith to form a homogeneous mixture, wherein the molar ratio of said thio-aldehyde to said acidic condensation catalyst is between 1:3 and 1:15 and wherein the temperature is maintained between 0° C. and 100° C., said thio-aldehyde having a saturated aliphatic chain of between 6 and 16 carbon atoms and having a tertiary hydrogen atom attached to a carbon atom in the delta position with respect to the thio-carbonyl group in said thio-aldehyde, adding the product mixture to a sufficient amount of water to cause a phase separation, separating the organic layer therefrom, and recovering the desired tetrahydrothiapyranyl compound from said organic layer.

9. A process which comprises adding the reaction product from the hydroformylation of mixed branched heptenes which boil between 170° and 210° F. to an acidic condensation catalyst miscible therewith to form a homogeneous mixture and recovering a tetrahydropyranyl compound from said mixture.

10. A process which comprises adding the reaction product from the hydroformylation of mixed branched chain heptenes which boil between 170° and 210° F. to sulfuric acid having an $H_2SO_4$ concentration of at least 80 percent to form a homogeneous mixture, wherein the molar ratio of said reaction product to said sulfuric acid is between 1:3 and 1:15 and wherein the temperature is between 0° C. and 100° C., adding said mixture to a sufficient amount of water to cause a phase separation, separating the organic layer therefrom and recovering a tetrahydropyranyl compound from said organic layer.

11. A process which comprises adding the front end fraction boiling up to 150° C. of the reaction product from the hydroformylation of mixed branched chain heptenes which boil between 170 and 210° F. to an acidic condensation catalyst miscible therewith to form a homogeneous mixture, and recovering a tetrahydropyranyl compound from said mixture.

12. A process which comprises adding 3,5-dimethylhexanal to an acidic condensation catalyst miscible therewith to form a homogeneous mixture and recovering 2,2,4-trimethyltetrahydropyran from said mixture.

References Cited in the file of this patent

Cologne et al.: Compt. Rend., volume 245, pages 974–6 (1957).